Nov. 23, 1937.    E. W. PENNINGTON ET AL    2,099,904
METHOD OF KALEIDOSCOPIC PROJECTION AND APPARATUS THEREFOR
Filed May 27, 1935    3 Sheets-Sheet 2
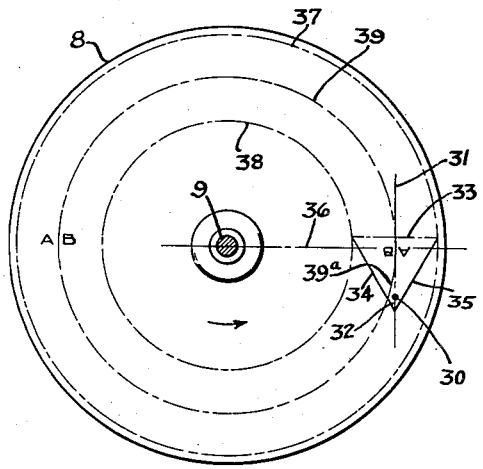
Fig. 4
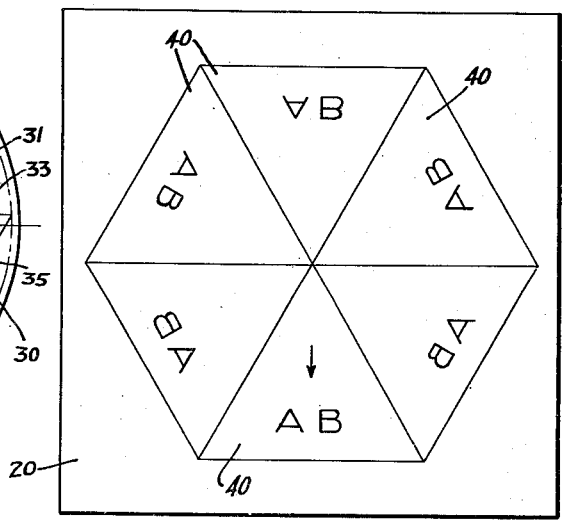
Fig. 5
Fig. 3
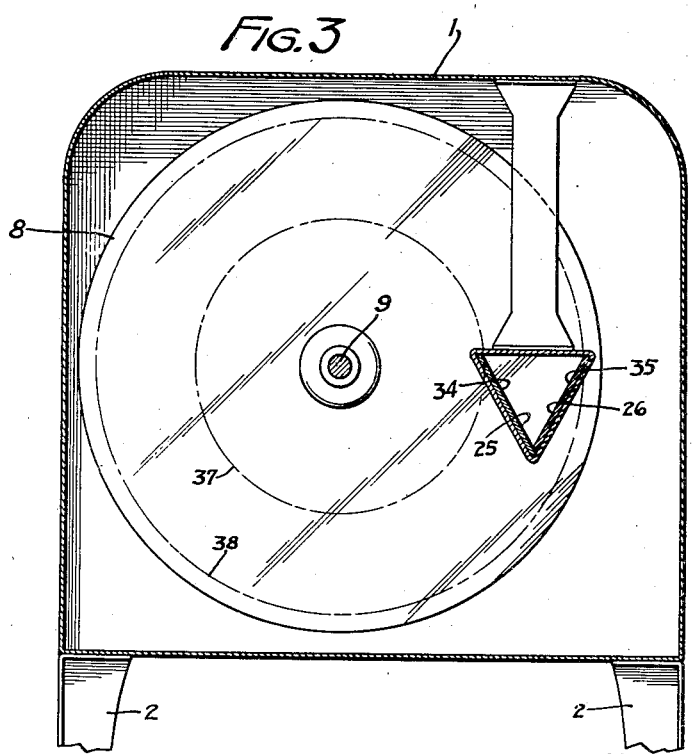
Fig. 6
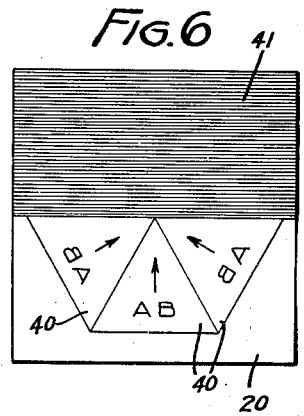
Inventors
EDMUND W. PENNINGTON
CHARLES E. PORTER, JR.
By Paul, Paul & Moore
ATTORNEYS

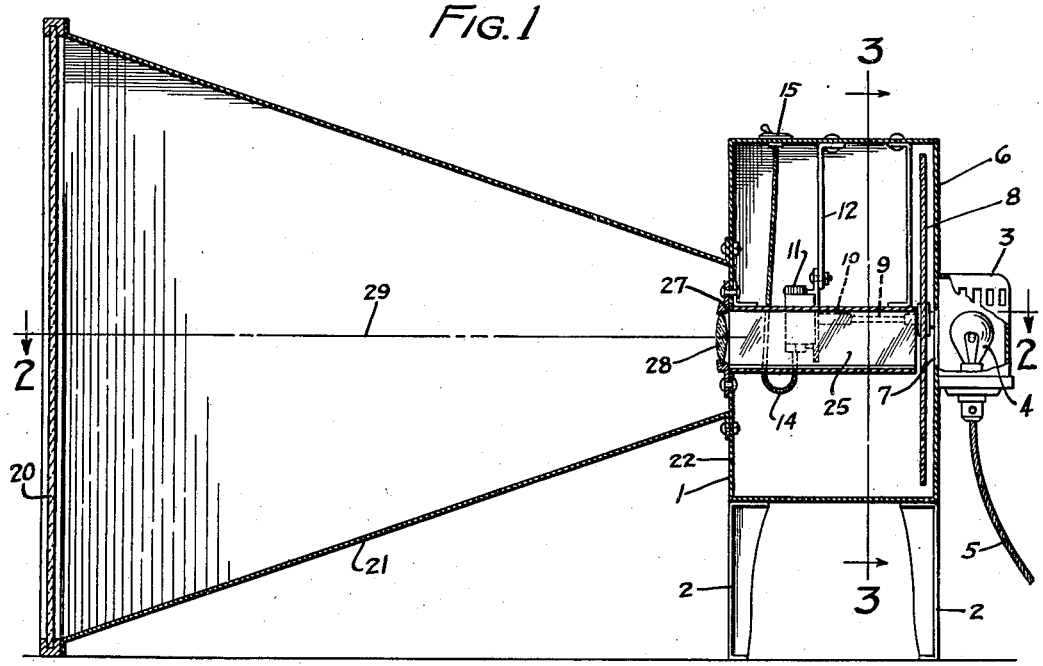
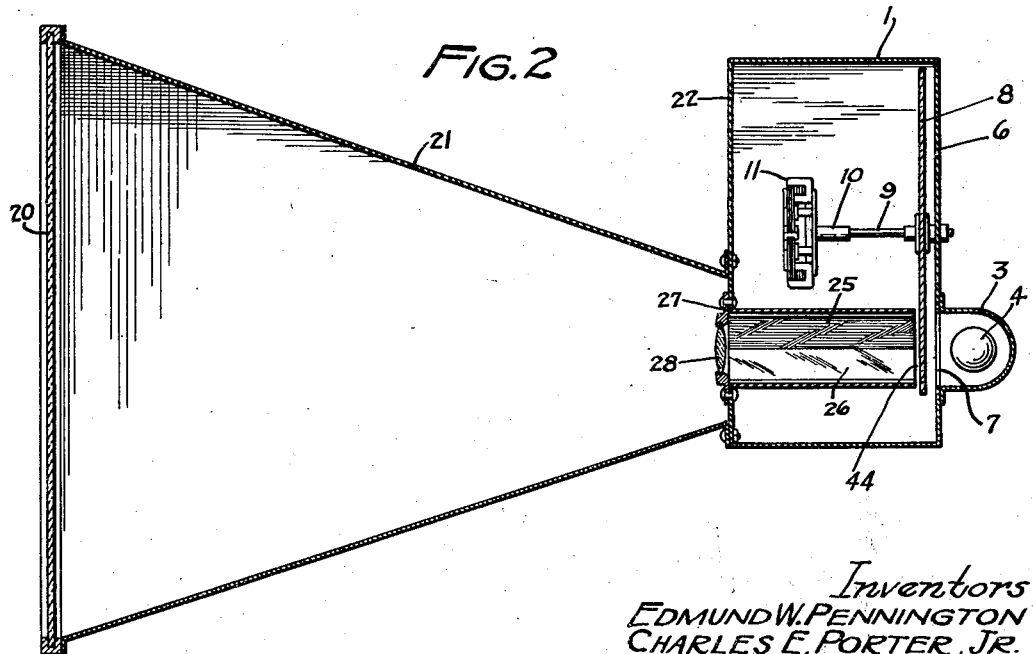

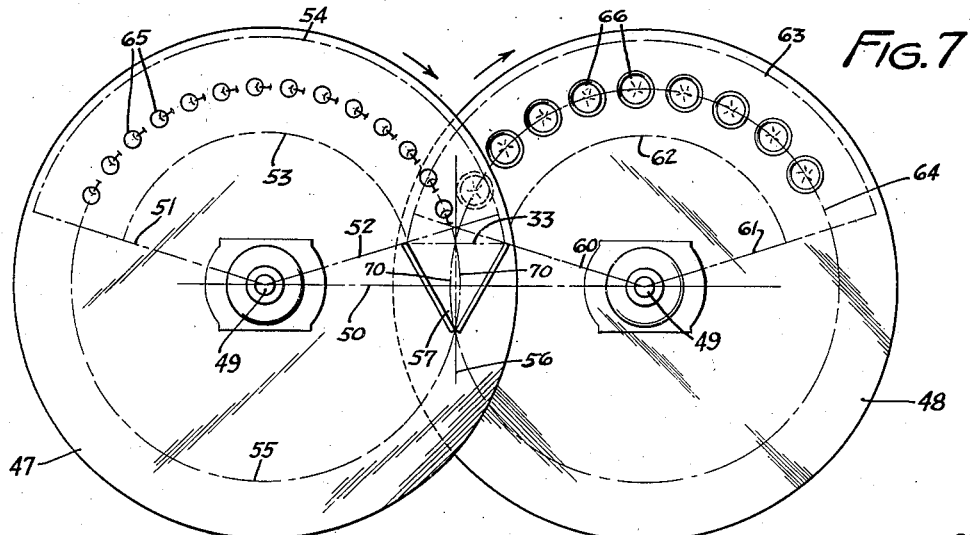
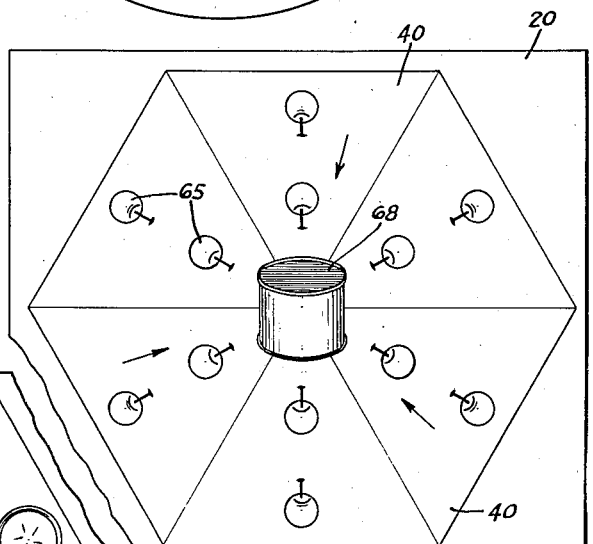
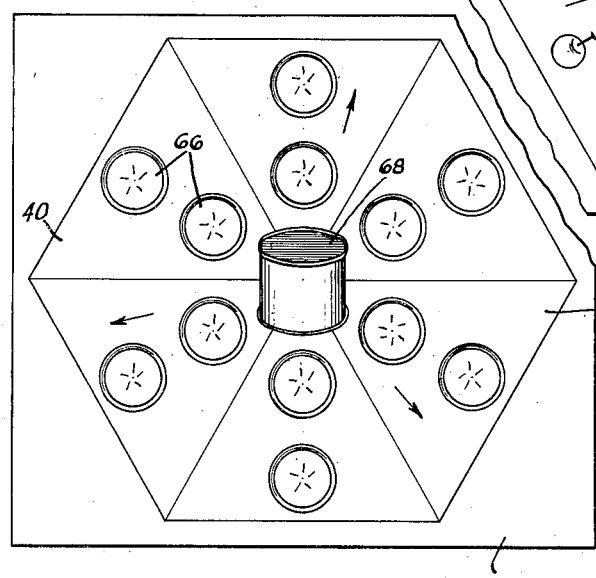
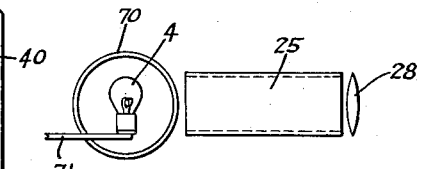

Patented Nov. 23, 1937

2,099,904

UNITED STATES PATENT OFFICE 2,099,904

METHOD OF KALEIDOSCOPIC PROJECTION AND APPARATUS THEREFOR

Edmund W. Pennington, Minneapolis, and Charles E. Porter, Jr., St. Paul, Minn., assignors to Vivid-Ad, Inc., Minneapolis, Minn., a corporation of Minnesota Application May 27, 1935, Serial No. 23,650

5 Claims. (Cl. 88—24)

This invention relates to methods and apparatus for producing moving kaleidoscopic images and projecting the same upon a screen, and is particularly concerned with the production of such images on a screen by the use of a continuously automatically rotating image-generating element through which light passes to reach the mirrors of the kaleidoscopic system.

Insofar as we are aware, no one has before conceived the idea of using a disk, cylinder or other continuously moving element as an image-generating means, automatically operating in relation to a kaleidoscopic system for generating images and projecting them upon a screen to move toward or away from a common center, nor has anyone, insofar as we are aware, projected images so generated upon a screen in some predetermined manner to pictorial or other matter on the screen or associated with the screen.

We are aware that the kaleidoscope is an old and well known apparatus and has been used for various purposes, but insofar as we are aware no device has been used for continuously projecting images automatically, and no device has been constructed which is capable of projecting clear, sharp, moving kaleidoscopic images on a projection screen.

Features of the invention include: the method of laying out or producing pictorial or other delineations or images on the disk, and the disk as an article of manufacture; the method of placement of the disk in relation to the axis of projection or to the field of illumination or to the optical axis of a kaleidoscopic projection system, and an apparatus with the disk so placed; the method of relating moving or stationary kaleidoscopic images to a stationary or to a moving image or delineation on or associated with a projection screen, and the apparatus for obtaining this relation; the method of using two image-carrying disks having portions overlapped in the field of illumination, or in the axis of projection and the rotation of said disks in the same or in opposite directions for the purposes set forth; the use of a single disk with means for alternately rotating it in, either direction; the use of two disks, and the continuous or intermittent rotation thereof, either in the same or in opposite directions; the use of a rotating cylinder through which the light beam is projected and upon which the delineations desired to be projected through the mirror and lens system are placed; and all details of the apparatus shown.

Objects, features and advantages of the invention will be set forth in the description of the drawings forming a part of this application, and in said drawings Figure 1 is a vertical longitudinal section through one form of the apparatus;

Figure 2 is a horizontal plan section taken approximately on line 2—2 of Figure 1;

Figure 3 is a vertical transverse section taken on line 3—3 of Figure 1;

Figure 4 is a face view of the image-carrying disk showing its relation to the kaleidoscopic projection system and optical axis thereof, and illustrating one arrangement of printed matter;

Figure 5 is a face view of the screen illustrating how the projected printed matter of Figure 4 appears thereon;

Figure 6 is a view like Figure 5 on a smaller scale, showing the upper part of the screen made opaque, to suppress half of the projected image;

Figure 7 is a modification showing a pair of overlapped image-carrying disks each having image-generating and non-image-generating areas;

Figure 8 is a face view of the screen showing how the projected matter of one of the disks of Figure 7 is made to appear to move toward and enter a stationary image on the screen;

Figure 9 is a face view of the screen showing how the projected matter of the other disk of Figure 7 is made to appear to emerge from the stationary image of the screen;

Figure 10 is a modification showing a cylindrical image-generating element, as distinguished from a disk; and Figure 11 is a view of one form of mask which is placed between the disk and the adjacent end of the mirror system.

First referring to Figure 1: Numeral 1 designates a suitable casing or cabinet supported by legs 2. Attached to the rear wall of the casing is a light box 3 having a suitable source of illumination therein, such as an electric light bulb 4 supplied through cable 5. The rear wall 6 of the casing 1 has an opening 7 through which the light passes. An image-carrying disk 8 is attached to a shaft 9, which shaft is journaled in the rear wall 6 and is connected with the shaft 10 of the synchronous or other suitable motor 11, supported as at 12 from the top of the casing 1. The motor is supplied by an electric cable 14 suitably controlled by a suitable switch 15. The source of power is not shown.

A projection screen of translucent material is indicated at 20, is held in a suitable frame, and a suitable flaring enclosing casing 21 connects the frame with the front wall 22 of the casing 1.

Between the screen and the disk is operably interposed a kaleidoscopic projecting system, including two mirrors 25—26, arranged in V-shaped relation at a suitable angle; in this instance the point of the V is disposed at the bottom. The front face 22 of the casing 1 has an opening 27 therein and in front of this opening and immediately adjacent the outermost ends of the mirrors is a suitable lens 28.

The optical axis is indicated at 29 and is represented by a line passing through the light source 4, mirror system 25—26, and the center of the lens. The field of illumination, or the projection field, see Figure 4, is the cross-sectional area of the triangular space, defined by the inner faces of the mirrors and by a line or plane 33 connecting the top of the mirrors. In Figure 1, the optical axis is arranged about centrally of the triangular space, but it is intended that its placement be adjacent the point of the V, whereby there is less distortion of mirror images as reproduced on the screen. The optical axis thus placed is represented at 30 in Figure 4.

A feature is the rotation of the mirror system to various angular positions, so that the direction of movement of the image on the screen may be changed or reversed, and be made to pass vertically upwards or vertically downwards or horizontally to the right or horizontally to the left.

A feature is the introduction of opaque masks with openings therein of various shapes, between the inner end of the mirror system and the disk, so as to produce correspondingly shaped fields on the projection screen, within which field or stage the colored or uncolored pictorial kaleidoscopic motion display takes place. These masks may be square, polygonal, star-shaped etc. When the entire opening of the mask lies within the confines of the field as represented by dot-and-dash lines in Figure 11, a plurality of spaced fields are reproduced on the screen. When only part of the opening lies within the field, only a single field is produced on the screen, the outline of which is a function of the shape of the opening of the mask.

In Figure 4, there has been simply represented the arrangement of lettering on the image-carrying or image-generating disk. This lettering or any other suitably shaped or placed matter may be used, and it may be either transparent, translucent or opaque, colored or uncolored. In laying out images or matter on the image-generating disk, a locating disk (not shown) is provided, which disk has thereon in proper position, marks defining the field of illumination. Figure 4 may represent the locating disk, the field of illumination being defined by lines 33, 34 and 35. The angular relation of the lines 34 and 35 may be varied. The locating disk is superposed on the disk 8 and is rotatably centered with the rotative center of disk 8. The delineations are applied to disk 8 in relation to the line-defined triangular area of the locating disk. In this way, the locating disk can be rotated upon the disk 8 to bring the area defined by the lines 33, 34 and 35 successively into different positions circumferentially of the disk 8.

The greatest radial width of the field of illumination is represented by the line 33, and circumferential dot-and-dash lines corresponding to this radial distance are indicated at 37—38. The line 39 is midway between the lines 37—38 and this line coincides with a line 31 bisecting the angle 32. All of the design material on the disk 8 will, therefore, be placed within the area defined by the lines 37—38 and may be placed across or at one side or the other of the line 39 either symmetrically or otherwise, or may be placed parallel with the line or on it.

Delineations of any suitable character may be placed on the disk. We call them image-generating delineations, and intend that these elements be attached to the disk drawn, painted, photographed or otherwise produced thereon. The matter may be pictorial. It may be printed, and we have given as the example, one arrangement of printing and have shown specifically how the projected printing will appear on the screen. The letters A B have been arranged on disk 8, one at each side of the mid-line 39. The disk is represented as rotating in counter-clockwise direction, so that on the screen the streams of letters will travel outwardly from the center. The result on the screen is shown in Figure 5, except that there will appear a stream of images in each segment 40, of the screen image. With the rotation of the disk in clockwise direction, the streams of images move on the screen, toward the center, as indicated by the arrows in Figure 6. The rotatable disk is made of single thickness translucent material and, of course, has that portion between lines 38 and 39 arranged between the light and the mirror portion of the kaleidoscopic system. The motor automatically rotates the disk so that the streams of images of the screen continuously move, the motion being toward or away from the center in accordance with the direction of rotation of the disk. The disk may be made of laminated material and may be transparent. Ground glass is preferably used for its diffusing characteristics.

A feature is the use of printed matter so arranged on the image-generating disk as to produce, after passage through the projecting system, at least one image on the screen which is right side up, and which moves toward or away from the image center of the screen. Thus streams of words or sentences may be projected upon the screen and made to pass from the center outwardly or from the periphery inwardly. The printed matter may be arranged circumferentially instead of radially. Although the lettering, as shown, appears on the screen right side up in the bottom segment 40, yet by reversing the lettering on the disk, it can be made to appear right side up in the top segment 40.

An important object of this invention is the method of associating plural streams of kaleidoscopically produced images with pictorial or other matter stationarily or movably related to or supported on or by the projection screen so that there is established a predetermined and significant relation between the streams of images and pictorial or other matter of said screen. When we speak of pictorial matter associated with the screen, we intend to include: sculpture or bas-relief figures attached directly to the surface of the screen or otherwise associated therewith; the painting of figures, signs or symbols directly upon the screen either transparent or opaque; and the photographic reproduction of such pictorial or other matter on the screen.

We believe ourselves the first to relate projected moving streams of separate and distant kaleidoscopic images to pictorial matter significantly associated with a screen for any purpose, including advertising, and the first to use such projected images to simulate the gathering or dispersion of objects relative to a moving or stationary image or delineation on such a screen.

When we speak of projecting images upon the screen we mean to include visible projection, either on that side of the screen nearest the lens, or by passage through the screen, upon that side most remote from the lens In Figure 6, the projection screen 20 has been rendered opaque as at 41 by any suitable means, such as a removable and adjustable mask, or by painting. This mask is shown as preventing visible projection of only one-half of the projected images, and one edge of the mask is related to the center of the screen image as a diameter. The mask may, of course, mask out a greater or lesser portion of the screen. Although not shown, it will be understood that the opaque part of the screen may have pictorial matter thereon, and the images may be made to move toward or away therefrom. The screen or mask 41 may be placed at the bottom of the field so that the upper three images of the field only are visible, or one or more of the segments 40 may be masked out. There is no intention to be limited as to the manner of masking.

Masks of various shapes may also be placed between the disk and the adjacent end of the mirror system. One shape of mask is shown at 43 in Figure 11. The mask is introduced at point 44, see Figure 2. The masks may be shaped to correspondingly vary the shape of the screen field, as desired.

In Figure 7, a modification has been shown in which a pair of disks 47—48 are arranged between the light source and the kaleidoscopic system. The rotative axes or shafts 49 of these disks are arranged on a line 50 which lies about half way between the top and the bottom point of the mirrors.

Each disk has circumferentially consecutively arranged image-generating and non-image-generating areas which are adapted to alternately move across the projection field. Portions of the peripheries of these disks are overlapped in the field of illumination or between the light source and the kaleidoscopic system. The image-generating area of disk 47 is defined by dot-and-dash lines 51, 52, 53 and 54, the remaining area of the disk being non-image-generating. The middle portion of the image-generating area of disk 47 is indicated by line 55, and this line twice crosses a line 56 bisecting the angle 57 of the mirrors. Crossing takes place respectively at line 33 and at the apex or V of the reflecting surfaces of the mirrors.

The image-generating area of the disk 48 is defined by dot-and-dash lines 60, 61, 62 and 63. The middle portion of the image-generating area is indicated by line 64, and this line has the same relation to lines 33 and 56 as does the line 55 of disk 47.

The areas of one disk are so related to the areas of the other that the non-image-generating area of one disk crosses the field of illumination while the image-generating area of the other disk is crossing said field, and means such as synchronizing motors 11 are used for rotating the disks in synchronous relation. There is no intention, however, to limit the broader aspects to the means for synchronizing the disks, but the specific means is claimed, in combination.

The illustration for the image-generating area has been simplified and conventionalized. The elements 65 of disk 47 may represent fruit such as cherries or apples. The images 66 of the disk 48 may represent pies into which the apples or cherries have been put.

In Figure 8, in the center, has been shown, for example, a can 68. It is placed, in this instance, at the screen image center. When the disk 47 moves in the direction of the arrow from the position shown in Figure 7, streams of cherries move toward the can from six directions, and apparently disappear within it. There may be a greater or lesser number of streams corresponding to a greater or lesser number of segments 40. During this rotation, the non-image-generating area of the disk 48 is also moving across the field of illumination so that no images are generated by it.

As soon as the disk 47 has rotated sufficiently to stop generation of images, the generation of images is begun by the disk 48, rotating as it will be noticed, in clockwise direction, but so that the images of the pies are moved away from the can, as shown in Figure 9, as though issuing from it. Of course, as in the first form of the invention, the motion paths of the streams will be slightly curved corresponding to the degree of curvature indicated at 70 by the lines 55—64 of Figure 7.

There is no intention to be limited regarding the character of the material represented on the disks or screen. For example, kaleidoscopically produced streams of coins may be made to appear to enter from all directions into a savings bank, or savings bank building represented on the screen, and later streams of symbols indicative of benefits resultant from saving may be made to appear to emerge from the bank or bank building. Strawberries may be seen to enter a can and strawberry shortcakes may be seen to emerge from the can; printed words or sentences may be seen to issue from the mouth of a person; streams of printed matter can be made to appear to issue from or to enter a newspaper establishment; streams of mechanical elements may be made to appear to be put together or taken apart; streams of unbaked biscuits or waffles may be made to appear to go into an oven, and later to come out of the oven, baked; coal or wood may be made to appear to go into a furnace or into a grate, and thereafter flames may be seen to emerge. By the expression "significant relation" as previously used and as used in the claims, we mean a logical relation as exemplified immediately above and as distinguished from a haphazard relation of the moving streams of images to the elements which are associated with the screen.

In each case, streams of moving kaleidoscopic images are seen to move toward or away from an image or other matter associated with or drawn on a suitable projection screen.

It will be noticed that in Figure 4, the axis of rotation 9 of the disk 8 is at the level indicated by the line 36 which level is adjacent the top edges of the mirrors, or line 33. In this instance, the path of the images in the field will be that represented by the portion 39ª of the line 39. The images will appear to enter the field slightly at one side of the point of the V, and will disappear at about the middle of line 33.

Self-starting electric clocks which start by a switch may be used to rotate the disks in one direction. A manually starting electric clock may be used. When two disks are used, each may be run by a synchronous motor, the motors being operated synchronously or non-synchronously with one another.

In Figure 10 is shown a modified feature, in which a cylinder 70 is used as an image-generating element instead of a disk, the light 4 being arranged within the cylinder on a support 71 which enters one end of the cylinder. The cylinder is supported and driven from a shaft, not shown, which is attached only to one end of the cylinder and which does not extend through the cylinder. The axis of projection is, in this instance, perpendicular to the rotative axis of the image-generating element.

We claim as our invention:

1. A device of the class described comprising a light source, a projection screen, a kaleidoscopic projection system operably interposed between the source and the screen, a pair of disks of light-transmitting material arranged between the light source and the kaleidoscopic system and having portions of their peripheries overlapped in the field of illumination, each disk having light-intercepting delineations which move across the field of illumination, and means for automatically rotating the disks, said screen having delineations thereon with which the kaleidoscopic images are related in a predetermined and significant manner including a mask making part of the screen opaque.

2. A device of the class described comprising a light source, a projection screen, a kaleidoscopic projection system operably interposed between the source and the screen, a pair of rotatable disks of light-transmitting material having portions of their peripheries overlapped in the field of illumination and between the light source and the kaleidoscopic system, each disk having consecutively arranged image-generating and non-image generating areas which alternately move across the field, the areas of one disk being so related to the areas of the other that the non-image-generating area of one disk crosses the field while the image-generating area of the other disk is crossing said field, and means for rotating the disks in synchronized relation.

3. A device of the class described comprising a light source, a projection screen, a kaleidoscopic projection system operably interposed between the source and the screen, a pair of rotatable disks of light-transmitting material having portions of their peripheries overlapped in the field of illumination and between the light source and the kaleidoscopic system, each disk having consecutively arranged image-generating and non-image-generating areas which alternately move across the field, the areas of one disk being so related to the areas of the other that the non-image-generating area of one disk crosses the field while the image-generating area of the other disk is crossing said field, and means for rotating the disks, said screen having delineations thereon with which the projected kaleidoscopic images of each disk are related in a predetermined manner.

4. In combination, a pair of rotatable transparent discs so arranged that portions of their margins overlap, an image projecting system, the axis of which passes through the overlapping marginal portions of the disc, each disc having a plurality of separate image-generating elements serially and marginally arranged to pass across the axis of projection of the system, the elements of one disc being different from but significantly related to those of the other disc, and a screen having an image in association with which the moving images are projected, the images of the screen and the images of the discs being related in a significant manner for advertising purposes.

5. In combination, a projection screen having an image thereon, a kaleidoscopic projector for projecting a second image on said screen in a desired relation to said first image, said kaleidoscopic projector comprising in operative relation, a light source, objective lens, a plurality of mirrors having their reflecting surfaces at an acute angle and a plurality of separate image-generating elements serially arranged to move in a path between the light-source and the lens and crossing the optical projection axis and substantially bisecting the angle between the reflecting surfaces, whereby the projected images appear to emanate from or converge toward the screen image.

EDMUND W. PENNINGTON.
CHARLES E. PORTER, Jr.